United States Patent [19]

Budliger et al.

[11] 4,169,374

[45] Oct. 2, 1979

[54] APPARATUS FOR CONTINUOUSLY MEASURING THE FLOW RATE OF EACH OF THE COMPONENTS OF A COMPOSITE FLUID FLOW FORMED OF A LIQUID AND OF A GAS

[75] Inventors: Jean-Pierre Budliger, Onex; Simon Arieh, Geneva, both of Switzerland

[73] Assignee: Battelle Development Corporation, Columbus, Ohio

[21] Appl. No.: 887,791

[22] Filed: Mar. 17, 1978

[51] Int. Cl.² .......................................... G01F 1/34
[52] U.S. Cl. .............................. 73/194 E; 73/205 R; 73/61 R
[58] Field of Search .................. 73/19, 61 R, 194 R, 73/194 E, 194 M, 195, 196, 205 R; 418/48

[56] References Cited

U.S. PATENT DOCUMENTS

| | | | |
|---|---|---|---|
| 2,028,407 | 1/1936 | Moineau | 418/48 |
| 4,056,002 | 11/1977 | Arieh et al. | 73/259 |

Primary Examiner—Herbert Goldstein
Attorney, Agent, or Firm—Karl F. Ross

[57] ABSTRACT

A system for measuring the respective volume rates of flow of two components of a composite flow comprises at least two positive displacement pumps such as Moyno pumps connected by a function chamber and having a common drive. The cells of the first pump and the cells of the second pump have predetermined but different volumes of respective cells which travel from the inlet to the outlet of the pump. A sensor is provided for detecting the pressure in the junction chamber.

8 Claims, 2 Drawing Figures

APPARATUS FOR CONTINUOUSLY MEASURING THE FLOW RATE OF EACH OF THE COMPONENTS OF A COMPOSITE FLUID FLOW FORMED OF A LIQUID AND OF A GAS

FIELD OF THE INVENTION

The present invention relates to an apparatus for continuously measuring the flow rate of each of the components of a composite fluid flow formed of a liquid and of a gas.

BACKGROUND OF THE INVENTION

A certain number of conventional devices already exist, which are applicable to the measurement "in line" of the flow rate of a mixed flow in a conduit of a gaseous phase and a liquid phase. The devices of this type nevertheless do not provide really satisfactory results except in the particular cases where there is only little or no slip between the two phases (low flow rates of one of the two phases, quasi homogeneous flows). On the other hand, in the case where the volumetic gas-liquid ratio becomes greater than a given threshold, considerable slip may occur between the two phases, which may give rise to nonhomogeneous flows of various types: stratified, annular, plug flows, etc. . . . In such cases, none of these conventional devices is any longer able to ensure the required precision.

To overcome these drawbacks due to slip between phases, one often resorts, when for example the flow rate of an oil well is to be evaluated, to another technique, which consists in provisionally installing a separator on the outlet conduit of the well and in measuring individually the flow rates of the phases. The principal drawback of this method is that it requires cumbersome and heavy apparatuses (measurement made at high pressure), the transport of which may be difficult at certain work sites. In addition, the separators presently used for this type of measurement are not in general designed for an installation in line and thus are not suitable for a continuous surveillance of the flow rate of an individual well.

In order to remedy the different drawbacks mentioned above, there has been recently proposed by the applicant (see U.S. Pat. No. 4,056,002 incorporated by reference in the present patent application) a new process for measuring the flow rate of each of the components of a two-phase flow. This process isolates, at a determined point of the conduit which conveys the gas-liquid two-phase flow of which one wants to measure the flow rate, successive fractions of this flow, so as to temporarily "freeze" during the time of measurement the slip between phases of this flow, and to cause the volume of each of the fractions thus isolated to vary, so as to turn to account the great difference in compressibility which exists between the gas and the liquid constituents of the said flow to deduce therefrom the respective proportions of liquid and of gas enclosed in each of these fractions, counting the fractions isolated per unit time thus permitting the flow rate of each of the phases of this flow to be deduced. Such a process has the major advantage over other processes known to date of allowing the measurement of flow rates of two-phase flows having significant slip between the phases, without it being necessary to resort to a separation of these phases. It follows that the different apparatuses which may be envisaged for carrying out this process may consequently assume a particularly compact form, while these apparatuses may moreover be fixedly installed or on the contrary be utilized as apparatuses for sporadic control.

Among the different apparatuses which may be envisaged for carrying out this process, there have been essentially described in the above-mentioned U.S. Pat. No. 4,056,002, apparatuses in which volumetric devices of the "vane pump" type are used to ensure the division of the composite flow into separate, successive fractions and the variation of the volume of these successive fractions. The utilization of these devices of the "vane pump" type creates certain problems in cases where one must proceed to measure two-phase flows liable to contain in addition solid materials in suspension (for example sand, pebbles . . . ), such as oil flows. It has indeed been indicated in the U.S. Pat. No. 4,056,002 that the utilization of these volumetric devices of the "vane pump" type was not obligatory and that one could likewise envisage utilizing devices of other types, such as devices of the "eccentric screw pump" kind commercially known by the name of Moyno pumps. There has nevertheless not been described in this U.S. Patent any exact embodiment of such "eccentric screw pumps". This utilization of eccentric screw pumps with a view to carrying out the process of flow-rate measurement defined above, could nevertheless not be immediately deduced from the embodiments relating to the "vane pumps", given that it seems a priori nearly impossible to conceive "eccentric-screw pumps" wherein the volume of the cells could be varied in a continuous manner as in the "vane pumps".

OBJECT OF THE INVENTION

The present invention has just the objective of showing as its object the provision of an improved apparatus for measuring the flow rate of a two-phase flow which utilizes the principles of "eccentric-screw pumps".

SUMMARY OF THE INVENTION

For this purpose, the present invention provides an apparatus for continuously measuring the flow rate of each of the components of a composite flow formed of a liquid and of a gas, comprising a volumetric device arranged to divide said composite flow into separate successive fractions having a first predetermined volume; and to cause the volume of the successive fractions to vary until it reads a second predertmined volume; means for determining by measurement the initial pressure of the said composite flow in the successive fractions having the first predetermined volume; means for determining by measurement the final pressure of the composite flow in the successive fractions having the second predetermined volume; means for measuring the flow rate of said composite flow with the help of the number of fractions isolated per unit time; means for determining the proportion of each component in each of the fractions with the help of the variations of volume and pressure; and means for determining the flow rate of each of said components with the help of the flow rate of said composite flow and of the proportion of each of said components in said flow. According to the invention the volumetric device consists of an arrangement of at least two eccentric screw pumps of the type comprising an elongated stator with an internal wall formed helicoidally cooperating with an elongated rotor with an external surface formed helicoidally so as to define a plurality of separate successive cells displaceable from one extremity of the stator to the other, the stators of the two pumps each having an inlet opening and a discharge opening. The two pumps are mounted end to end so that the discharge opening of the stator of the first pump communicates with the admission opening of the stator of the second pump via a junction chamber and the rotors of the two pumps possess a common shaft. The two pumps are chosen so that the cells of the first pump have said first predetermined volume and that the cells of the second pump have the second predetermined volume.

In the apparatus which has just been defined, pumps at least two "eccentric screw" pumps are mounted end to end via a junction-chamber, (these pumps being moreover chosen so as to have cells of different volumes), for providing the volumetric device charged with ensuring the division of the composite flow into successive fractions and the variation of volume of these fractions. Such an arrangement differs from the volumetric devices of the "vane pump" type described in the U.S. Pat. No. 4,056,002 by the fact that the cells of the eccentric-screw pumps serve here simply to ensure the isolation of the successive fractions of the two-phase flow, but not the junction chamber, which variation is then abrupt and discontinuous (in contrast with the continuous variations of volume and of pressure carried out in the devices of the "vane pump" type of the U.S. patent).

According to the particular arrangement and the number of "eccentric-screw" pumps that one chooses to use, one may moreover cause the successive isolated fractions to undergo volume variations of very diverse nature. Thus, one may subject these successive fractions to a simple compression or (simple expansion) by utilizing an arrangement of two pumps, wherein the volume of the downstream pump is less or greater respectively than that of the cells of the upstream and downstream pumps.

In the case where the liquid phase of the two-phase flow to be measured contains a non-negligible proportion of dissolved gases (or is the case for example of a mixture of liquid and gaseous hydrocarbons in equilibrium), one will utilize in a particularly advantageous manner an arrangement permitting an expansion to be effected followed by a recompression (the application of a simple expansion indeed running the risk of affecting the precision of the measurements, on account of the process of instantaneous degassing which inevitably accompanies such an expansion; and the application of a simple compression being moreover liable to entail the risks of over-pressure and rupture in the limiting case where the flow would be reduced to the liquid phase alone). The application of an expansion followed by a compression presents the major advantage of allowing more precise measurements, the gas liberated in the course of the expansion not having time to be redissolved in the course of the compression (dissolution being as a matter of fact a slow phenomenon in opposition to degassing which is a rapid process). From the respective measurements of the initial pressure $P_o$, of the pressure at the end of expansion $P_1$ and of the pressure at the end of recompression $P_o$ one can determine (in a manner similar to that indicated in U.S. Pat. No. 4,052,002), the amount of gas present in the free state as well as an indication of the amount of gas dissolved within each of the fractions.

BRIEF DESCRIPTION OF THE DRAWING

The attached drawing illustrates, schematically and as an example, an embodiment of the apparatus for flow-rate measurement, according to the invention, in which one causes the two-phase flow of which one wishes to measure the flow rate, to undergo an expansion followed by a recompression. This best mode embodiment is more particularly destined to allow measurement of the flow rate of a two-phase flow wherein a part of the gaseous phase turns up in dissolved form in the liquid phase. In the drawing.

SPECIFIC DESCRIPTION

Figure 2:
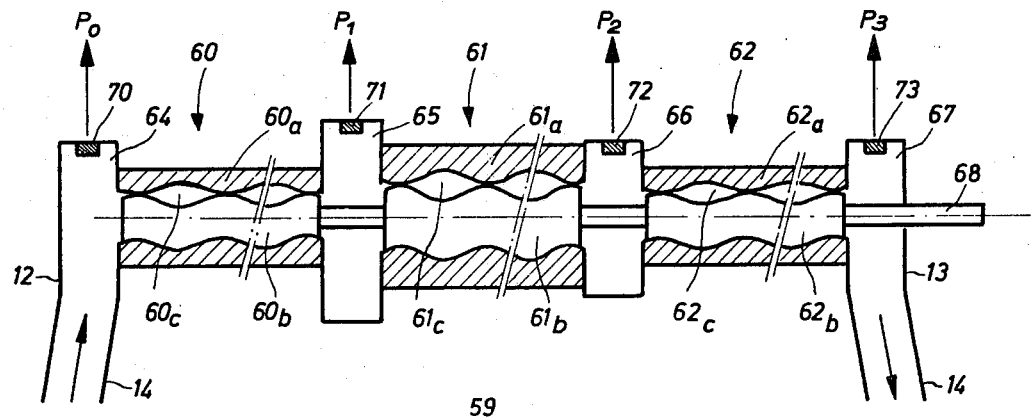
FIG. 2 is a longitudinal sectional view of the volumentric device incorporated in this embodiment.

This embodiment, which is designated in the drawing at 50, comprises a volumetric device 59, intercalated, via its inlet and discharge openings 12 and 13, in a conduit 14 which conveys the two-phase flow of which the flow rate is to be measured. With this volumetric device 59 there are moreover associated various mechanical members, electric circuits and display devices which will be subsequently described.

This volumetric device 59 (shown in longitudinal section in FIG. 2) consists of a set of three Moyno pumps 60 to 62 mounted end to end via junction chambers 64 to 67 Moyno pumps are eccentric screw pumps composed of an elongated stator with an internal heliocoidally formed wall cooperating with an elongated rotor with an external surface formed heliocoidally so as to define a plurality of separate successive cells displaceable from one end of the stator to the other). This set of Moyno pumps 60 to 62 comprises, respectively; a first pump 60, the stator chamber 60a of which is connected to the inlet opening 12 via a junction chamber 64; a second pump 61, the stator chamber 61a of which is connected to the stator chamber 60a of the first pump via a junction chamber 65; and a third pump 62, the stator chamber 62a of which is connected to the stator chamber 61a of the second pump via a junction-chamber 66, this stator chamber 62a being moreover connected with its other end to the outlet orifice 13 via a junction-chamber 67. The rotor screws 60b and 62b of these pumps 60 to 62 are mounted fixedly connected to each other on a common shaft 68, which is itself solidly connected with the shaft of a motor/brake member 37. The rotor screws 60b to 62b define, by cooperating with the respective stator chamber 60b to 62c, a plurality of cells 60c to 62c posessing a constant volume for each of the pumps 60 to 62, namely, respectively, for the first pump 60 a plurality of cells 60c each having a volume $V_o$, for the second pump 61 a plurality of cells 61c each having a volume $V_1$, and for the third pump 62 a plurality of cells 62c each having a volume $V_2$.

The respective dimensions of the pumps 60 to 62 are chosen so that, on one hand, the volume $V_1$ of the cells 61c is greater than to the volume $V_o$ of the cells 60c, and that, on the other hand, the volume $V_2$ of the cells 62c is less than the volume $V_1$ of the cells 61c, so that the two-phase fluid introduced at the pressure $P_o$ by the orifice 12 undergoes, successively, an expansion from $P_o$ to $P_1$ when passing from the first pump 60 to the second pump 61, and a recompression from $P_1$ to $P_2$ when passing from the second pump 61 to the third pump 62. The pressures $P_o$, $P_1$ and $P_2$ prevailing within the respective cells 60c, 61c and 62c are measured with the help of pressure sensors 70, 71 and 72 mounted in the respective junction-chambers 64, 65 and 66 situated upstream of these cells. (The three pumps 60, 61 and 62 indeed only serve to isolate the respective volumes $V_o$, $V_1$ and $V_2$, without modifying the pressure thereof, from which it follows that the pressures $P_o$, $P_1$ and $P_2$ corresponding to these volumes are identical with the pressures prevailing in upstream junction chambers).

Thanks to the fact that an expansion is first effected (from volume $V_o$ to volume $V_1$), an important part of the gas phase dissolved in the liquid phase of the mixture contained in the cells 60c of the first pump 60 is liberated spontaneously by passing into the cells 61c of the second pump 61, to be added to the portion of the gaseous phase originally free. The reverse phenomenon cannot occur as rapidly so that, in the cells 62c of the third pump 62, the part of the gaseous phase which was previously liberated can not be redissolved in the liquid phase. One will consequently understand that the measurements capable of being effected with the installation just described may be obtained with good precision despite the fact that a good part of the gas phase was dissolved in the liquid phase of the flow.

Besides, the utilization of a volumetric device such as that of FIG. 2 allows one to avoid damage of mechanical nature from arising when the liquid traversing the conduit 14 becomes momentarily liquid. As a matter of fact, such a case would be liable to give rise, in the downstream part of the device where recompression of the fluid occurs, to actions of a mechanical nature which are particularly high on account of the fact that a liquid is incompressible, if this recompression was not preceded by an equivalent decompression in the upstream part of the device.

It is to be remarked that, on account of the foregoing, the pressure values registered by the sensors 71 and 72 are effectively utilized for the measurement of each component of the flow. For example, the sensor 70 will be employed only to determine the degassing rate of the part of the gaseous phase in the liquid phase.

Figure 1:
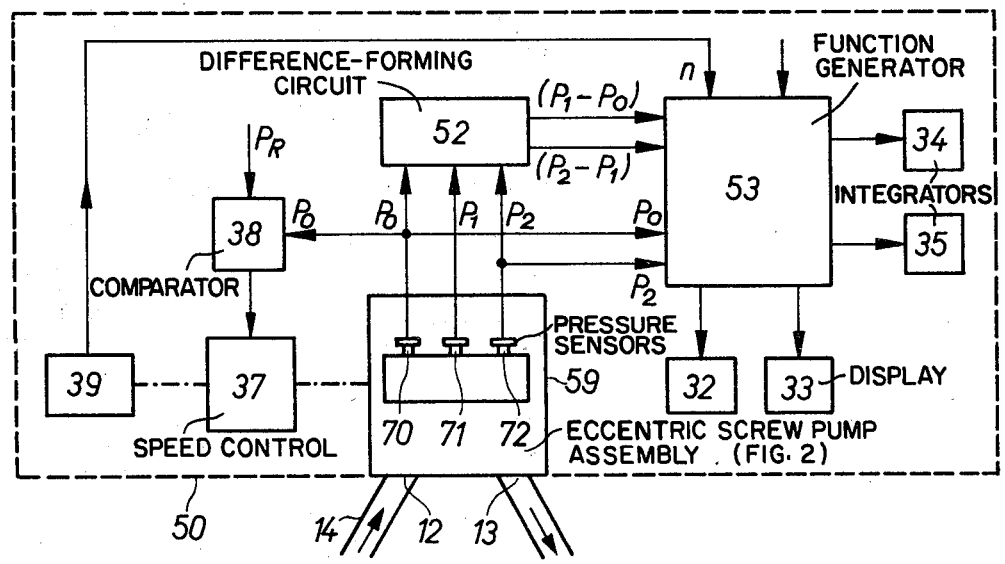
FIG. 1 is a diagram illustrating this embodiment.

Returning to the diagram of FIG. 1, one can observe that the sensors 70, 71 and 72 are connected to the imputs of an electric circuit 52 whereof the role is to provide, as a function of information received, the differences $(P_1 - P_o)$ and $(P_2 - P_1)$, which values are next directed to the inlet of a function generator 53.

On the shaft 68 common to the rotor screws 60b, 61b and 62b of the volumetric device 59 a member 37 is moreover mounted which may consist of a motor or a brake according to whether in the volumetric device 55 the compression prevails over the expansion or inversely. This member 37 is governed by a control device 38, whereof the function is to regulate the speed of rotation n of the rotors of the volumetric device 59 in such fashion that the disturbance of flow in the conduit 14 liable to be entailed by this device 59 is as small as possible. For this purpose, the control device 38 receives at input two pressure indications, respectively, the indication of a reference pressure $P_r$, equal for example to a pressure difference between a measurement point situated upstream of the admission orifice 12 and a measurement point situated downstream of the discharge orifice, and the indication of the pressure $P_o$ provided by the sensor 70; according to the value of the difference registered between reference pressure $P_r$ and effective pressure $P_o$, the control device 38 acts, via the member 37, on the speed of rotation of the shaft 68 so as to cause said difference to constantly tend to zero.

At the end of the shaft 68 there is also disposed a tachometer 39, which permanently delivers, to one of the inputs of the function generator 53, the rotational speed n of the shaft 68. In the function generator 53 are moreover stored different data inherent in the system (data which may for example be introduced by any additional input), such as the values $V_o$, $V_1$ and $V_2$ and different parameters specific to the gas-liquid couple constituting the flow to be measured (for example the density).

The role of this function generator 53 is exactly to determine, as a function of the different values received, the volumetric or mass flow rate at each instant of gas and of liquid of the flow having traversed the volumetric device 59, this determination being effected in the manner described in the above-mentioned U.S. Pat. No. 4,052,002 (see more specially the variants of FIGS. 6 and 7 of this patent).

The results thus derived are transmitted to respective display members 32 and 33 connected to the output of generator 53. At the output of the generator 53 there are likewise connected two integrator devices 34 and 35, set up to ensure counting of the overall quantities of gas and of liquid which have traversed the volumetric device during a determined period.

In the above-described embodiment, the reference pressure $P_r$ may correspond to the pressure difference $P_o - P_3$ ($P_3$ being the pressure prevailing in the junction-chamber 67, measured by means of a sensor 73). In a certain range of pressure $P_o$, the speed of rotation will thus be established so as to introduce a minimum pressure loss across the measuring member.

Another possibility consists in choosing the reference pressure $P_r$ equal to the pressure difference $P_2 - P_3$. In this case it is possible to adjust the speed of rotation of the volumetric device in a manner such that the pressure difference $P_2 - P_3$ may be null and to measure the total volumetric flow rate across the pump while excluding any escape flow rate within this third body of the pump (Due to the fact that an expansion from $P_o$ from $P_1$ is followed by a recompression of the fluid from $P_1$ to $P_2$, it is possible to find configurations in which the total pressure difference between $P_o$ upstream and $P_3$ downstream can be quite low and the measurement device does not entail particular disturbances in the fluid of the conduit 14).

The apparatus according to the present invention presents the major advantage, with respect to the apparatuses described in the above-mentioned U.S. Pat. No. 4,056,002, of allowing the measurements of pressure $P_o$, $P_1$ and $P_3$ to be effected outside the pump bodies (measurements effected as a matter of fact in the junction-chambers arranged between these pump bodies), so that any risk of disturbing these measurements (liable to be caused by passage of the rotor in front of the sensors) is thus avoided. The utilization of such a device moreover allows operation with two-phase flows liable to contain in addition solid materials in suspension (such as sand, pebbles . . . ), which is particularly advantageous for example in the case of petroleum applications.

The described apparatus is applicable to all fields which require the evaluation of two-phase flow rates. Such a process finds a particularly interesting application in the measurement of the flow rate of two-phase flow of hydrocarbons, particularly in view of the surveillance of oil-wells.

We claim:

1. Apparatus for continuously measuring the rate of flow of each of the components of a composite flow formed of a liquid and of a gas, comprising:

a volumetric device for dividing said composite flow into separate successive fractions of a first predetermined volume and for varying the volume of said successive fractions from said predetermined volume to a second predetermined volume;

means for measuring the change in pressure of said composite flow resulting from the volume change from the first predetermined volume to the second predetermined volume;

means for measuring the flow rate of said composite flow;

means for determining the proportions of each component in each of said fractions from a comparison of the volume variation and pressure change of said composite flow in successive fractions; and means for determining the rate of flow of each of said components from the flow rate of said composite flow and from the proportions of each of said components in said flow, said volumetric device consisting of an arrangement of at least two positive displacement pumps mounted end to end via a junction chamber, each of said pumps being arranged so as to comprise a plurality of separate successive cells displaceable from its inlet opening to its discharge opening, said two pumps being chosen so that the cells of the first pump have said first predetermined volume and that the cells of the second pump have said second predetermined volume.

2. Apparatus according to claim 1, wherein said two positive displacement pumps are eccentric screw pumps of the type comprising an elongated stator with an internal wall formed helicoidally cooperating with an elongated rotor with an external surface formed helicoidally so as to define a plurality of separate successive cells displaceable from one extremity of said rotor to the other, the rotors of the two pumps possessing a common shaft.

3. Apparatus according to claim 1 or claim 2 wherein the volume of the cells of said second pump is chosen smaller than that of the cells of said first pump, so as to cause the composite flow traversing said volumetric device to undergo a compression.

4. An apparatus as defined in claim 1 or claim 2 wherein the volume of the cells of said second pump is chosen greater than that of the cells of said first pump so as to cause the composite flow traversing said volumetric device to undergo an expansion.

5. Apparatus according to claim 2 wherein said means for measuring the change in pressure of said composite flow comprises a first pressure sensor disposed in a chamber situated upstream said first pump and a second pressure sensor disposed in said junction chamber situated between said first and second pumps, said sensors being electrically connected to a subtracter for providing the difference of pressure existing between said chambers and transmitting these differences to a function generator.

6. Apparatus according to claim 1 wherein said volumetric device further comprises a third pump mounted end to end with said two first pumps via a second junction chamber, said three pumps being chosen so that the volume of the cells of said second pump is greater than that of the cells of the first and of the third pumps, so as to cause the two-phase flow traversing said volumetric device to undergo an expansion followed by a recompression.

7. Apparatus according to claim 6 wherein said means for measuring the change in pressure of said composite flow comprises a first pressure sensor disposed in a chamber situated upstream of said first pump, a second pressure sensor disposed in said first junction chamber situated between said first and second pumps, and a third pressure sensor disposed in said second junction chamber situated between said second and third pumps, said sensors being electrically connected to a subtracter for providing the differences of pressure existing between said chambers and transmitting these differences to a function generator.

8. In an apparatus for continuously measuring the flow of each of the components of a composite flow formed of a liquid and of a gas, comprising:

a volumetric device arranged to divide said composite flow into separate successive fractions having a first predetermined volume and to cause the volume of said successive fractions to vary until it is brought to a second predetermined volume;

means for determining by measurement the initial pressure of said composite flow in said successive fractions having said first predetermined volume;

means for determining by measurement the final pressure of said composite flow in said successive fractions having said second predetermined volume;

means for measuring the flow rate of said composite flow by the number of fractions isolated per unit time;

means for determining the proportion of each component in each of said fractions by said variations of volume and pressure;

means for determining the flow rate of each of said components from the flow rate of said composite flow and of the proportion of each of said components in said flow, the improvement wherein said volumetric device consists of an arrangement of at least three eccentric screw pumps of the type comprising an elongated stator with an internal wall formed helicoidally cooperating with an elongated rotor with an external surface formed helicoidally so as to define a plurality of separate successive cells displaceable from one extremity of said rotor to the other, the stators of said pumps each having an inlet opening and a discharge opening, and said pumps being mounted end to end so that the discharge opening of the stator of a first pump communicates with the inlet opening of the stator of the second pump via a first junction chamber, and the outlet of said second pump communicates with a third pump via a second junction chamber, pumps possess a common shaft, said pumps being chosen so that the cells of the first pump have said first predetermined volume and that the cells of the second pump have said second predetermined volume, and pressure sensors are disposed in each of said junction chambers, said sensors being electrically connected to a subtracter for providing the difference of pressure existing between said chambers and for transmitting these differences to a function generator.

* * * * *